United States Patent [19]
Moore

[11] 3,811,700
[45] May 21, 1974

[54] AXLE CLAMP FOR SHEAR RUBBER VEHICLE SUSPENSION

[75] Inventor: Robert G. Moore, Elkhart, Ind.
[73] Assignee: Hickman Developments, Inc., Eden, N.Y.
[22] Filed: Jan. 29, 1973
[21] Appl. No.: 327,815

[52] U.S. Cl. .............................. 280/124 R, 267/52
[51] Int. Cl. .......................................... B60g 11/24
[58] Field of Search......... 280/124 R; 267/52.53, 15

[56] References Cited
UNITED STATES PATENTS
| | | | |
|---|---|---|---|
| 3,279,820 | 10/1966 | Hickman......................... | 280/124 R |
| 3,630,541 | 12/1971 | Carlson............................... | 267/52 |
| 2,077,048 | 4/1937 | Konetsky.............................. | 267/53 |

Primary Examiner—Philip Goodman
Attorney, Agent, or Firm—Harold I. Popp

[57] ABSTRACT

In adapting the suspension of the Hickman U.S. Pat. No. 3,279,820 to rear drive axles with round tubular ends, conventional U-bolt clamps between the axle ends and the out-of-round torsionally rigid beam extending lengthwise of the line of vehicle travel were found inadequate. The present clamp avoids this inadequacy by providing plates fitting the top and bottom sides of each torsionally rigid bar; U-bolts embracing the corresponding round tubular axle end with their legs extending through openings in these plates; vertical spacers interposed under pressure between these plates and embracing the torsionally rigid beam and arranged between the corresponding legs; and blocks in line with the spacers and interposed under pressure between the axle end and the adjacent plate. The spacers and blocks unify the torsionally rigid beam, plates, U-bolt legs and axle to prevent destructive strains on the legs.

4 Claims, 5 Drawing Figures

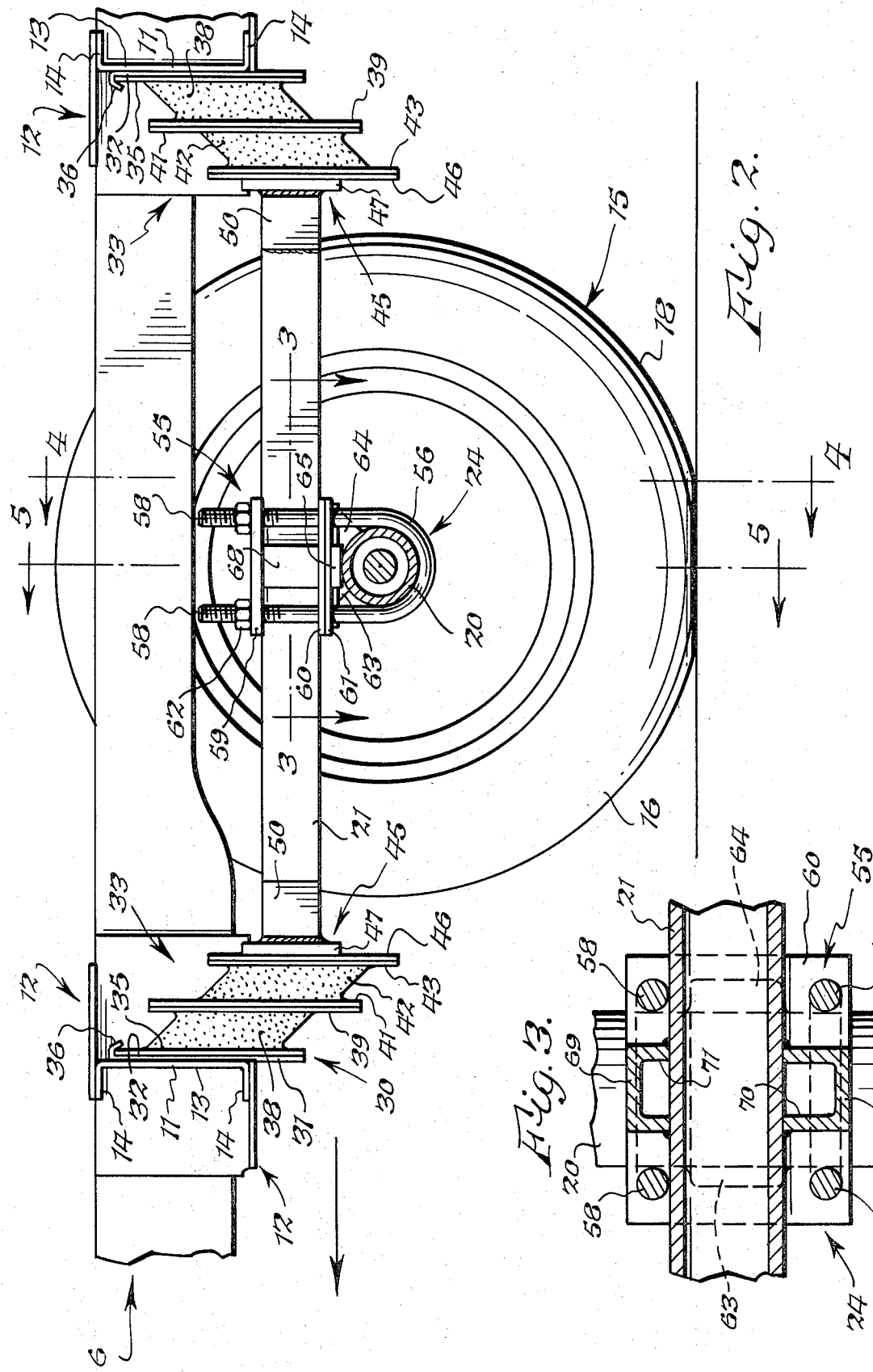

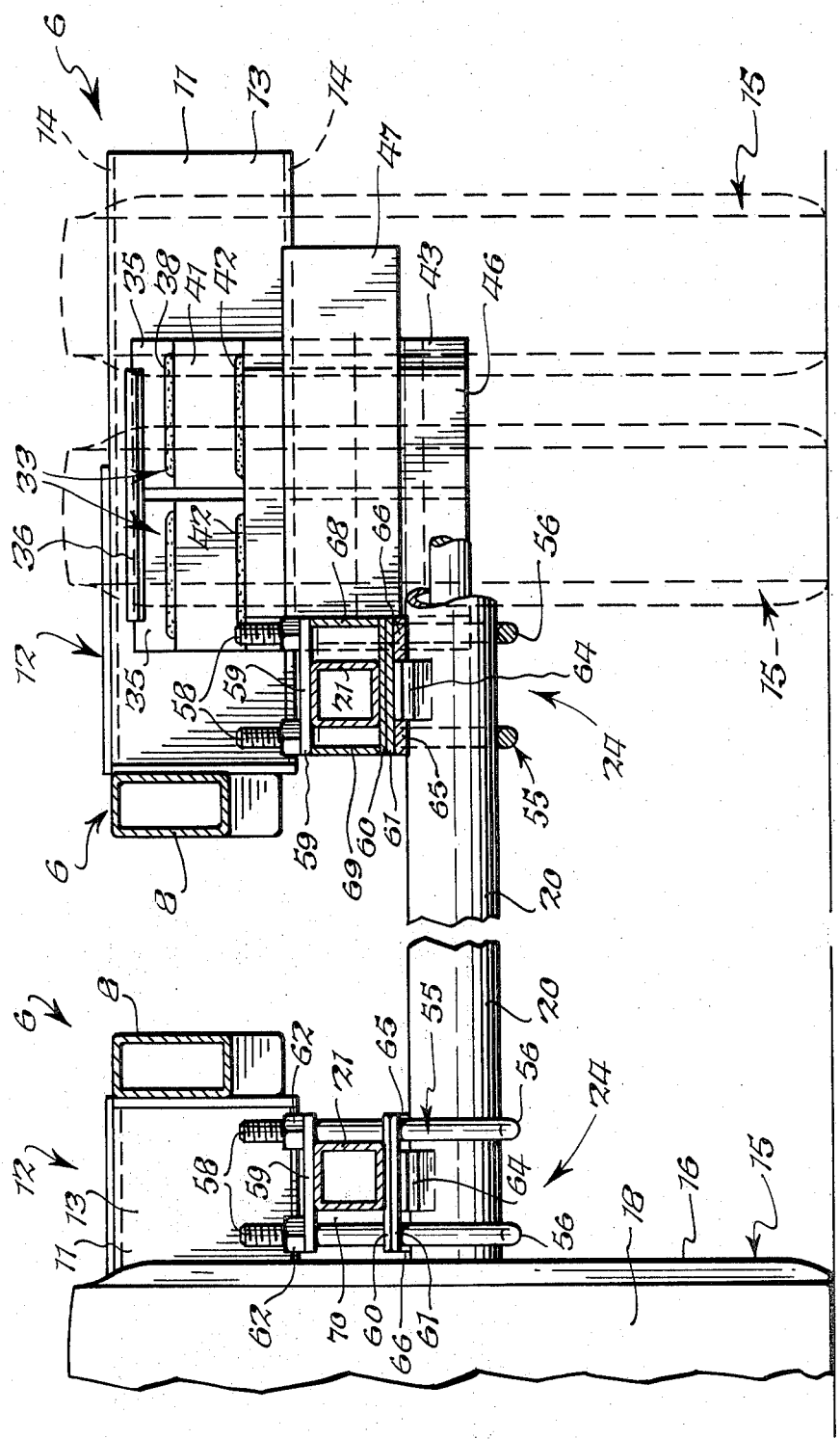

AXLE CLAMP FOR SHEAR RUBBER VEHICLE SUSPENSION

The principal objects are to provide a U-bolt clamp between the round end of an axle and an out-of-round torsionally rigid bar extending lengthwise of the line of vehicle travel which is simple, low cost, reliable, and not subject to failure, particularly in breakage of the U-bolt legs.

Other objects and advantages of the invention will be apparent from the following description and drawings in which:

FIG. 2 is an enlarged fragmentary vertical longitudinal sectional view thereof, taken generally on line 2—2 of FIG. 1.

FIG. 3 is a further enlarged fragmentary horizontal section taken generally on line 3—3, FIG. 2.

FIGS. 4 and 5 are vertical transverse sectional views taken generally on the correspondingly numbered lines of FIG. 2.

Figure 1:
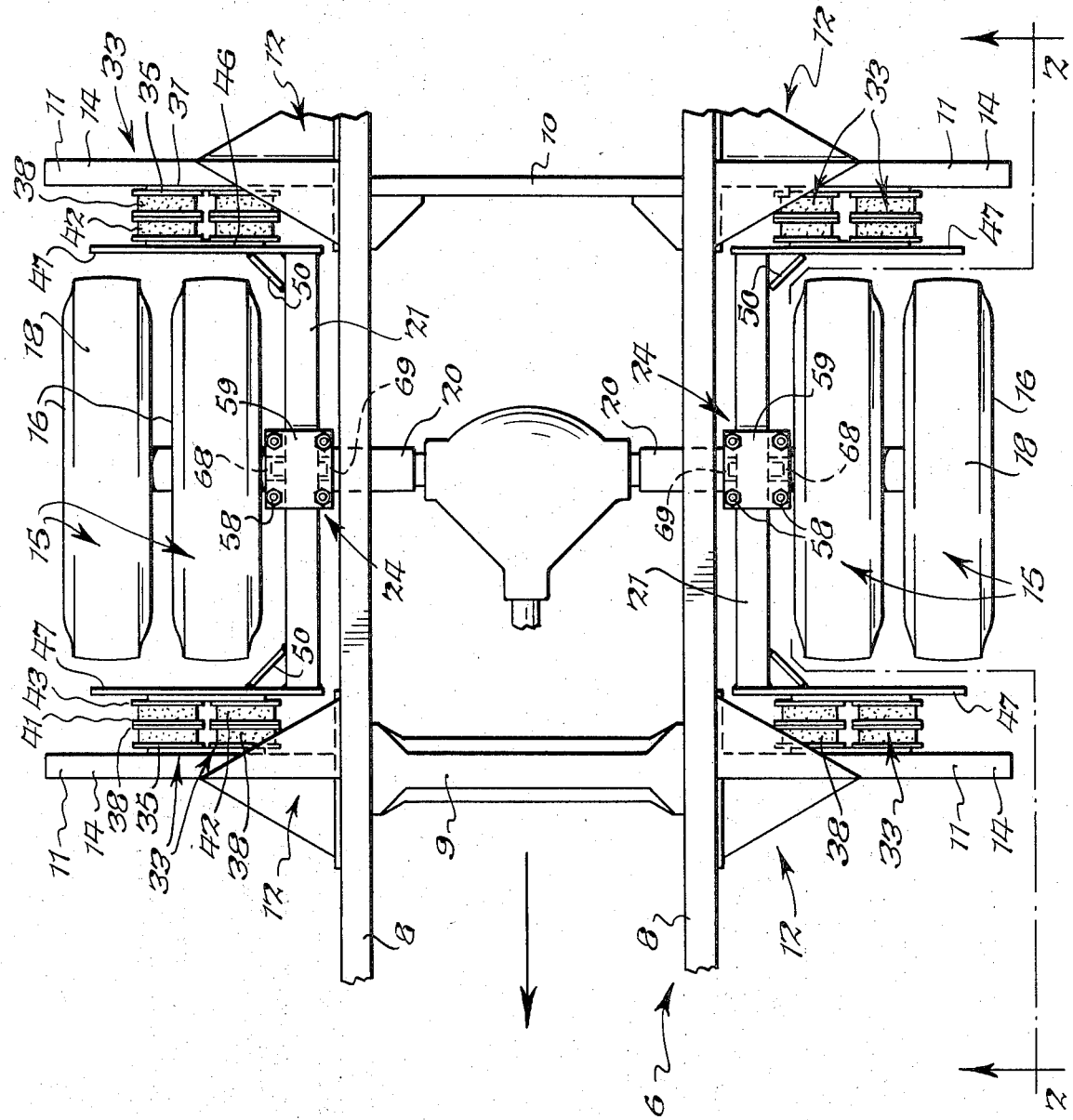
FIG. 1 is a fragmentary top plan view of a vehicle frame supported by a spring suspension embodying the present invention.

The main frame 6 of the vehicle can be of any suitable construction and is shown as comprising a pair of main longitudinal side frame beams 8 of rectangular form in cross section and suitably connected together by cross beams 9, 10. Adjacent each end of each cross beam 9 and 10 a horizontal cantilever channel bar 11 is welded to the outside of the corresponding main longitudinal side frame beam 8 and projects outwardly therefrom generally in line with the corresponding cross beam 9 or 10. Each channel bar is rigidified, with reference to its main longitudinal side frame beam 8, by a suitable array 12 of gusset plates welded to both. The channel bars 11 on each side of the vehicle frame are arranged with their webs 13 opposing each other and with their flanges 14 extending away from the wheels therebetween.

The numeral 15 represents a dual wheel at each side of the vehicle frame, each of these dual wheels having rubber tires 16 provided with treads 18. Each of these dual wheels is conventionally journalled on the round tubular end spindle of a drive axle 20.

A horizontal torsionally rigid out-of-round beam 21 is supported at its central part on each end of the axle 20 and extends lengthwise of the line of movement of the vehicle frame to points adjacent the treads 18 of the corresponding dual wheel tires 16. To provide its torsional rigidity each beam 21 is preferably made of tubular, rectangular or box form in cross section as best shown in FIGS. 3, 4 and 5 and each of these beams have sufficient torsional and vertical bending strength to transmit all vertical forces from the vehicle frame 6 directly to the end of the drive axle 20. The present invention is embodied in the clamp or connection 24 between each torsionally rigid beam 21 and each end of the axle 20, as described in detail hereafter.

The numeral 30 represents a frame bracket fixed to the vehicle frame 6 adjacent each end of each torsionally rigid beam 21. This frame bracket is shown as being in the form of an upright rectangular plate 31 extending transversely of the line of movement of the vehicle frame 6 and each is preferably welded to the web 13 of a corresponding cross bar 11 which faces the companion dual wheel 15 to provide an upright face 32 opposing the treads 18 of the tires and also opposing the frame bracket 30 at the same side of the vehicle frame 10.

The resilient support of the vehicle frame 6 is provided by a plurality of arrays 33 of rectilinear movement, shear rubber bodies which provide the required resilient resistance to movement of the body relative to the wheels 15. Two of such arrays 33 are provided between each end of each torsionally rigid beam 21 and its cantilevered frame bar 11. To this end a pair of outer rectangular metal plates 35 each has one face arranged against the face of each frame bracket plate 31 and is secured thereto by corner bolts (not shown). The upper edges of each pair of metal plates 35 are preferably seated in a lip 36 along the top edge of each bracket plate 31. These pairs of plates 35 are arranged side by side so that each pair of arrays are arranged one behind the other as viewed from the side of the vehicle. To the opposite face of each of these pairs of plates 35 is vulcanized a block or a body 38 of resilient rubber. The opposite sides of each of these pairs of bodies 38 of rubber have vulcanized thereto a rectangular intermediate plate 39. Each of these pairs of rectangular intermediate plates 39 is secured, as by corners bolts (not shown) to a similar rectangular metal plate 41. To the face of each of these pairs of intermediate plates 41 which faces its dual wheel 15 is vulcanized a block or body 42 of rubber the opposite generally vertical face of each of these pairs of rubber bodies having vulcanized thereto an inner rectangular metal plate 43. The rectangular inner metal plates 43 of each array 33 are parallel with their companion intermediate plates 39 and 41 and with the companion outer rectangular metal plates 35.

A cantilever bracket 45 is fixed to and projects horizontally laterally outwardly from each end of each torsionally rigid beam 21 into the space between the corresponding bar 11 and treads 18 of the dual tire 16 and secured through a plate 46 at its outboard or other end to the pair of inner plates 43 of the corresponding arrays 33 of rubber spring bodies 38 and 42. To this end each cantilever bracket 45 is shown as being in the form of thick vertical rectangular metal plate 47 secured, as by welding, to the adjacent end of the companion torsionally rigid beam 21 and preferably provided with one or more triangular gusset plates 50 to reinforce this connection.

At its outboard end each cantilever plate 45 has welded thereto the rectangular plate 47, each of these plates being in face-to-face relation with the pair of inner rectangular plates 43 of the corresponding arrays 33 of spring bodies 38, 42 and secured thereto by corner bolts (not shown).

The present invention is directed to the clamp 24 connecting each torsionally rigid beam 21 to its end of the drive axle 20. Conventional automotive practice, particularly the axle end being round or cylindrical, and the torsionally rigid beam 21 being rectangular in cross section, clearly indicated the use of U-bolts. However, following conventional automotive practice resulted in occasional failure of a U-bolt through one of its legs snapping apart or being bisected under the stains imposed in service. Such failure of the U-bolts is avoided by the clamp of the present invention.

A pair of such U-bolts 56 are provided for the clamp 24 at the end of each axle, the U-bolts being at opposite sides of the corresponding torsionally rigid beam 21 with their round parts embracing and closely fitting the cylindrical end of the axle 20 as best shown in FIG. 2. The upstanding legs 58 of each U-bolt 56 extend through corner holes in a flat rectangular metal top plate 59 and pair of flat bottom plates 60, 61. These plates are identical in plan and can be identical in thickness. The nuts 62 of the U-bolts screw down against the corners of the top plate 59.

Lugs 63, 64 welded to the opposite sides of each end of the axle 20 provide a flat top face seat for the central part of the lowermost bottom plate 61. In addition, a pair of metal blocks 65, 66 are welded to the bottom face of each lowermost bottom plate 61 to straddle the lugs 63, 64 and to bear downwardly on top of their end of the axle 20. These blocks 65, 66 provide full support on the axle 20 for the parts of the lowermost bottom plate 61 which extend along the axle 20 away from its lugs 63, 64.

The uppermost plate 60 of the pair of bottom plates rests on the lowermost bottom plate 61 and has welded to its upper face a pair of spacers 68, 69 in the form of upright channels which straddle the corresponding torsionally rigid beam 21. The channels 70, 71 of each pair of these upright spacers face each other and the edges of their legs are close to or touching the upright sides of their torsionally rigid beam 21. The important feature of each pair of these upright spacers 68, 69 is that they are arranged directly above the blocks 65, 66, respectively, and, when the nuts 62 are tightened, have full contact with the opposing faces of the plates 59 and 60 substantially the full extent of the projection of these plates lengthwise of the axle 20 beyond their companion torsionally rigid bar 21.

In the operation of the suspension, upward movement of either drive wheel 15, through its end of the axle 20, effects a corresponding upward movement of the center part of the torsionally rigid beam 21 fixed to this axle end. This effects a corresponding movement of the cantilever brackets or plates 45 at the opposite ends of each torsionally rigid beam 21. This movement is yieldingly resisted by the four arrays of rectilinear movement shear rubber bodies 38 and 42 connected with these cantilever plates 45 at one end and connected with the cantilever channel-shaped cross bars 11 of the vehicle frame 8 at their opposite ends.

It will particularly be noted that the clamp 55 between each torsionally rigid beam 21 and the corresponding end of the axle 20 resists breakage of the legs 58 of the U-bolts 56. Thus, viewing from FIG. 5, the torsional or cam-like action of the rectangular cross section shape of the beam 21 against the top plate 59 and bottom plates 60, 61 would tend to bend or arch these plates and thereby create a bending, as well as a torsional, strain on the legs 58 of the U-bolts 56 connecting the outboard sides of these top and bottom plates 59 and 60, 61. Failure of the U-bolts from such bending strain is avoided by the upright spacers 68, 69 interposed under pressure between each top plate 59 and its companion bottom plate 60, and by the blocks 65, 66 directly below these spacers and interposed under pressure between the bottom-most plate 61 and the top of the end of the axle 20. These blocks and spacers serve to unitize the axle 20 and each group of plates 59, 60, and 61 and U-bolts 56 to eliminate destructive forces against the legs 58 of these U-bolts.

It is, of course, obvious that the two bottom plates 60, 61 could be one thick plate, that all three plates 59, 60 and 61 could be identical in thickness as well as plan, and that the ends of the spacers 68, 69 could be welded to either or both of the plates 59, 60.

By "rubber" as used in the accompanying claims is meant both natural rubber and also synthetic rubber and mixtures of natural and synthetic rubbers.

I claim:

1. A vehicle spring suspension adapted to be interposed between a vehicle frame and each end of an axle having wheels with rubber tires for supporting each side of the vehicle frame, including a metal beam which is out-of-round in cross section and torsionally rigid about its longitudinal axis and has its central part arranged adjacent the corresponding axle end and extends lengthwise of the line of vehicle travel, a frame bracket adapted to be attached to said vehicle frame adjacent each end of a corresponding torsionally rigid beam, a rectilinear movement shear rubber body fixed to and interposed between each companion pair of said frame brackets and beam ends, wherein the improvement comprises a clamp between the center of each torsionally rigid beam and its axle end, comprising a pair of metal plates respectively fitting against the top and bottom of the center of each out-of-round torsionally rigid beam and each having opposite portions projecting beyond the sides of their torsionally rigid beam in line with the axle, one of said plates being interposed between each axle end and its torsionally rigid beam and the other plate fitting the side of its torsionally rigid beam remote from its axle end, U-bolts having their rounding portions embracing each axle end and their legs extending through corner openings of the adjacent pair of said plates, a nut on each leg bearing against the face of said other plate remote from its axle end to draw this other plate toward its torsionally rigid bar and axle end, a block at each side of each torsionally rigid bar and interposed under pressure between the corresponding axle end and the opposing side of said one of said plates, and a pair of spacer members on opposite sides of said torsionally rigid beam each in line with a corresponding one of said blocks and interposed under pressure between said plates.

2. A vehicle spring suspenson as set forth in claim 1 wherein each of said spacers is welded to one of said plates.

3. A vehicle spring suspension as set forth in claim 2 wherein said spacer members are in the form of vertical channel bars with the edges of their flanges opposing said torsionally rigid beam.

4. A vehicle spring suspension as set forth in claim 1 additionally including a lug welded to each axle end and providing a flat faced seat for said one of said plates.

* * * * *